(12) United States Patent
Kimpel et al.

(10) Patent No.: US 8,981,593 B1
(45) Date of Patent: Mar. 17, 2015

(54) CONTROL DEVICE AND METHOD FOR VARYING POWER SUPPLY AND LOAD

(76) Inventors: Herbert F. Kimpel, Janesville, WI (US);
Timothy A. Stevenson, Milton, WI (US)

(*) Notice: Subject to any disclaimer, the term of this patent is extended or adjusted under 35 U.S.C. 154(b) by 897 days.

(21) Appl. No.: 13/160,629

(22) Filed: Jun. 15, 2011

Related U.S. Application Data

(60) Provisional application No. 61/358,131, filed on Jun. 24, 2010.

(51) Int. Cl.
| | |
|---|---|
| H02J 1/10 | (2006.01) |
| H02J 3/00 | (2006.01) |
| H02J 3/14 | (2006.01) |
| H02M 1/10 | (2006.01) |

(52) U.S. Cl.
USPC .......................................................... 307/29

(58) Field of Classification Search
USPC ........................................ 307/11, 29, 64–66
See application file for complete search history.

(56) References Cited

U.S. PATENT DOCUMENTS

| | | | | |
|---|---|---|---|---|
| 6,260,649 | B1* | 7/2001 | Carney, Jr. | 180/220 |
| 2002/0074973 | A1* | 6/2002 | Brotto | 320/150 |
| 2007/0278860 | A1* | 12/2007 | Krieger et al. | 307/64 |
| 2009/0289600 | A1* | 11/2009 | Lin et al. | 320/134 |

* cited by examiner

*Primary Examiner* — Rexford Barnie
*Assistant Examiner* — Rasem Mourad
(74) *Attorney, Agent, or Firm* — Craig A. Fieschko, Esq.; DeWitt Ross & Stevens S.C.

(57) ABSTRACT

A control unit connected to power supplies and loads transitions between states to connect supplies and loads in various configurations. In a first state, for example, the first supply and first load are connected in series, and the second supply and second load are connected in series. In a second state, the first supply and second load are connected in series, and the second supply and first load are connected in series. The control unit transitions between states via a transition state in which all supplies and loads are connected in parallel, avoiding load power disruptions. First and second power supplies can be rechargeable battery packs, and first and second loads can be any devices drawing or generating power. If one load is a motor and the other a generator, one battery can power the motor and the other battery can be charged using the generator.

17 Claims, 6 Drawing Sheets

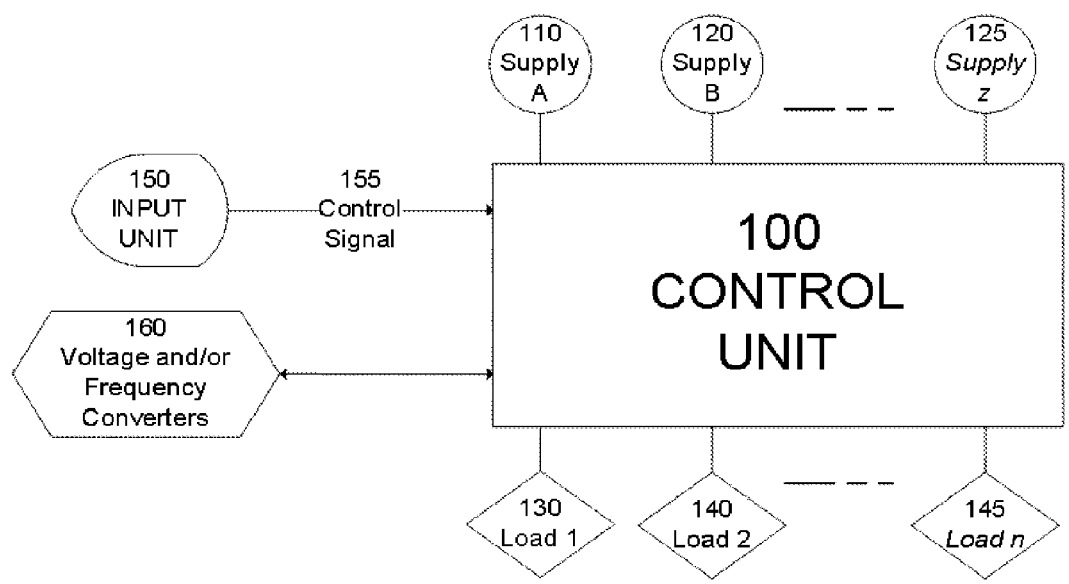
FIGURE 1
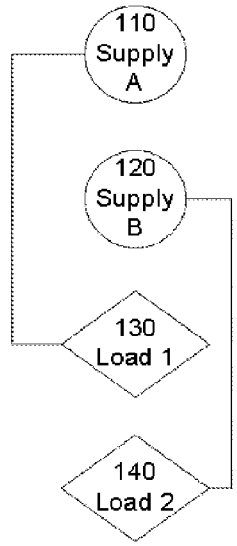 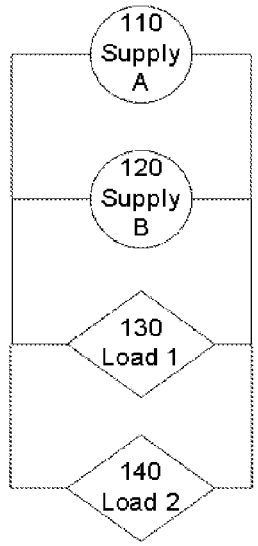 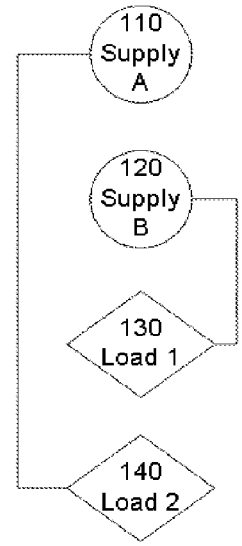
FIGURE 2A   FIGURE 2B   FIGURE 2C

CONTROL DEVICE AND METHOD FOR VARYING POWER SUPPLY AND LOAD

CROSS-REFERENCE TO RELATED APPLICATIONS

This application claims priority under 35 USC §119(e) to U.S. Provisional Patent Application 61/358,131 filed Jun. 24, 2010, the entirety of which is incorporated by reference herein.

FIELD OF THE INVENTION

This document concerns an invention relating generally to systems and methods with multiple power supplies and loads able to switch connections between the power supplies and loads without interruption.

BACKGROUND OF THE INVENTION

Conventional systems having multiple power supplies (such as battery packs) connected to one or more loads (such as any battery-operated devices) are not able to seamlessly transition between states in which different supplies are connected to different loads. For example, in a conventional system having two batteries and two devices, if the connections between the batteries and devices are to be switched, the devices are first disconnected from their respective batteries, and the devices are re-connected to the other batteries. Connection and reconnection of power supplies and loads disrupt the power supplied to devices, resulting in power dips and spikes. Such power interruptions can at the very least be disruptive to normal operations, and can be unacceptable or damaging in critical or sensitive systems. What is needed is a system able to switch power supplies without interrupting the power supplied to loads.

Moreover, conventional devices incorporating battery packs either use the battery pack to power the device, or charge the battery pack using another power supply (such as a power outlet), as batteries are not traditionally able to be concurrently drained and charged. Vehicles having motors able to run on electrical power, for example, include a battery pack used to power the engine. In vehicles running only on electric power, the battery pack is used to power the engine, and is subsequently recharged using a power outlet when the vehicle is not being powered by the battery pack. In hybrid vehicles, the battery pack is used either to power the engine, or the battery pack is charged by a generator when the hybrid vehicle is not being powered by the battery pack (but rather by, for example, a combustion engine). This practice wastes energy because when the battery pack is being used to power the vehicle, energy that could otherwise be generated (by, for example, a regenerative braking system) and stored in a battery is not being utilized. What is needed is a system configured to run on one battery pack, charge another battery pack, and readily transition between which battery pack powers a device and which battery pack is being charged by a generator.

SUMMARY OF THE INVENTION

The invention, which is defined by the claims set forth at the end of this document, is directed to control devices used to interchange the connections between supplies and loads which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIG. 1, an exemplary system includes a control unit 100 configured to interface with a first power supply 110 ("Supply A"), a second power supply 120 ("Supply B"), a first load 130 ("Load 1"), and a second load 140 ("Load 2"). The first and second power supplies 110, 120 can be, for example, rechargeable battery packs. The first and second loads 130, 140 can be any combination of devices which draw power (such as a motor) or generate power (such as a generator). The control unit 100 switches between non-transition states in which the power supplies and loads are connected in various configurations. For example, in a first state (see FIG. 2A), the control unit 100 connects the first power supply 110 to the first load 130 in series, and the second power supply 120 to the second load 140 in series. To swap power supplies and loads, the control unit 100 is able to transition to, for example, a second state (see FIG. 2C) by connecting the first power supply 110 to the second load 140 in series, and the second power supply 120 to the first load 130 in series. In a vehicle, for example, with one load being a motor and the other load being a generator (based on, e.g., regenerative braking), the system would enable the vehicle to power the motor with one power supply while charging the other power supply with the generator.

So that power to the loads is not disrupted during transitions between the states, the control unit 100 enters a transition state (see FIG. 2B) when switching between the first and second states. In the transition state, the first power supply 110, the second power supply 120, the first load 130, and the second load 140 are connected in parallel. A first supply voltage of the first power supply 110 and a second supply voltage of the second power supply 120 are preferably substantially equal to each other (e.g., 12 volts). Also, a first supply frequency of the first power supply 110 and a second supply frequency of the second power supply 120 are preferably substantially equal to each other (e.g., DC or AC at 60 hertz). However, a more versatile system may include converters 160 to harmonize the voltages and/or frequencies of the first and second power supplies 110, 120 when the control unit 100 detects that the power supplies connected to the control unit 100 have different voltages and/or frequencies. The power supply voltages and frequencies are brought in alignment using the converters 160 before the control unit 100 enters the transition state. The transition state enables the system to maintain the same voltage across each load during state switching as is experienced by the loads during each state.

As shown in FIG. 1, the control unit 100 may interface with an input unit 150 configured to accept an instruction to transition between the first and second states from a user. In non-electronic systems, the input unit 150 may be any manually-operated device (such as a lever) configured to effect movement of a connector that connects and disconnects the first and second power supplies 110, 120 with the first and second loads 130, 140 to complete circuits required by the first, second, and transition states. In electronic systems, the input unit 150 may be any device capable of accepting an input from the user and transmit a control signal 155 to the control unit 100. The control signal 155 directs the control unit 100 to, for example, transition between the first and second states. Alternatively or additionally to user input, the control unit 100 may be configured to detect a first charge level of the first power supply 110 and a second charge level of the second power supply 120, and to transition between the first and second states when the first or second charge level reaches a predetermined charge level threshold (see FIG. 3).

The parallel connections of the transition state help maintain voltages across devices as the connections between power supplies and loads are switched. Advantageously, entering the transition state during state switches avoids periods during which the loads are disconnected from the power supplies (resulting in undesired power interruptions), or periods during which the loads are connected to both power supplies in series (resulting in undesired voltage spikes). Such transitions allow even sensitive systems to continue operating seamlessly even as power supplies are switched. Devices may utilize one battery pack while concurrently charging another battery pack, harnessing energy that is otherwise wasted by systems with one battery pack. When one battery pack is low on charge, a battery pack with more charge may be swapped in to power the device without power disruption. Further advantages and features of the invention will be apparent from the remainder of this document in conjunction with the associated drawings.

BRIEF DESCRIPTION OF THE DRAWINGS

FIG. 1 represents a control unit 100 interfacing with an input unit 150 and a variable number of power supplies (A through "z") and loads (1 through "n").

FIG. 2A represents a first (non-transition) state in which a first power supply 110 is connected to a first load 130 in series, and a second power supply 120 is connected to a second load 140 in series. FIG. 2B represents a transition state in which the power supplies and loads are all connected in parallel. FIG. 2C represents a second (non-transition) state in which the first power supply 110 is connected to the second load 140 in series, and the second power supply 120 is connected to the first load 130 in series.

DETAILED DESCRIPTION OF PREFERRED VERSIONS OF THE INVENTION

Figure 3:
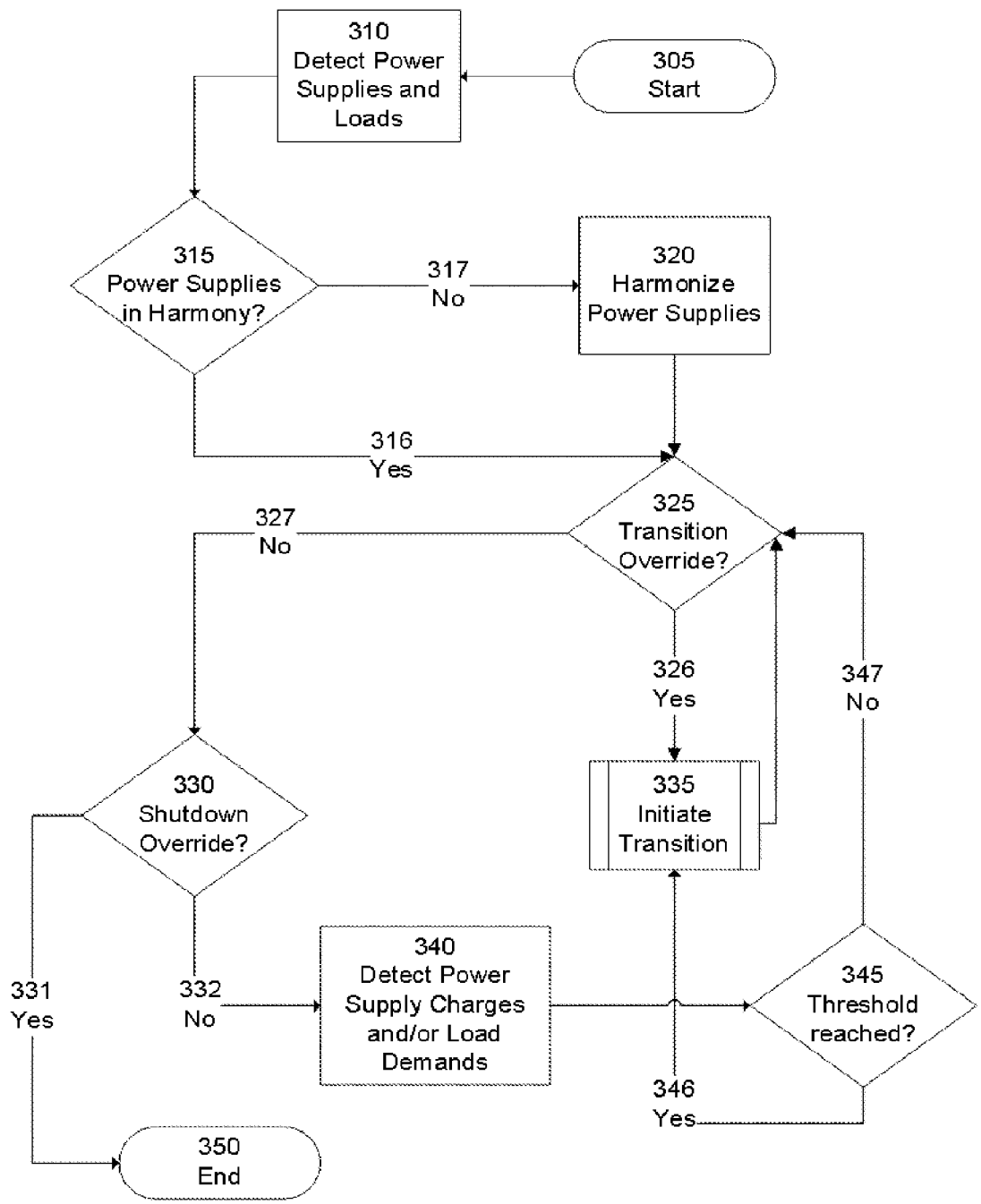
FIG. 3 is a flowchart 300 showing an exemplary set of steps in the operation of the control unit 100 of FIG. 1.

Turning initially to FIG. 3, an exemplary set of steps 300 in the operation of the control unit 100 begins at start 305. The presence of the power supplies and loads connected to the control unit 100 may be detected 310, as well as the supply voltages and frequencies of the power supplies. The control unit 100 may be configured to determine whether the power supplies are in harmony 315. If not 317, the control unit 100 may use voltage and frequency converters 160 (which may include, for example, an "OutBack" X-240 auto transformer) to harmonize 320 the voltages and frequencies of the power supplies connected to the control unit 100. With the power supplies in harmony 316 (or if already in harmony when connected), the control unit 100 may determine whether a user has overridden 325 the process 300 to manually transition between states. If yes 326, the control unit 100 initiates 335 the transition between states (via the transition state). If no 327, the control unit 100 determines whether a user override 330 has ended the process 300 (and optionally shut down the control unit 100). If yes 331, the process 300 is ended 350. If no 332, the control unit 100 detects 340 the power supply charge levels and/or load demands. The control unit 100 may compare the charge levels and demands to thresholds to determine whether predetermined thresholds have been reached 345 (for example, a battery is low or a load has begun demanding more power than can be provided by the power supply with which the load is connected). If no 347, the control unit 100 may return to step 325. If yes 346, the control unit 100 initiates 335 a transition. Following a transition, the control unit 100 may determine whether the user wishes to override 325 the transition, or shut down 330 the process 300.

Figure 4:
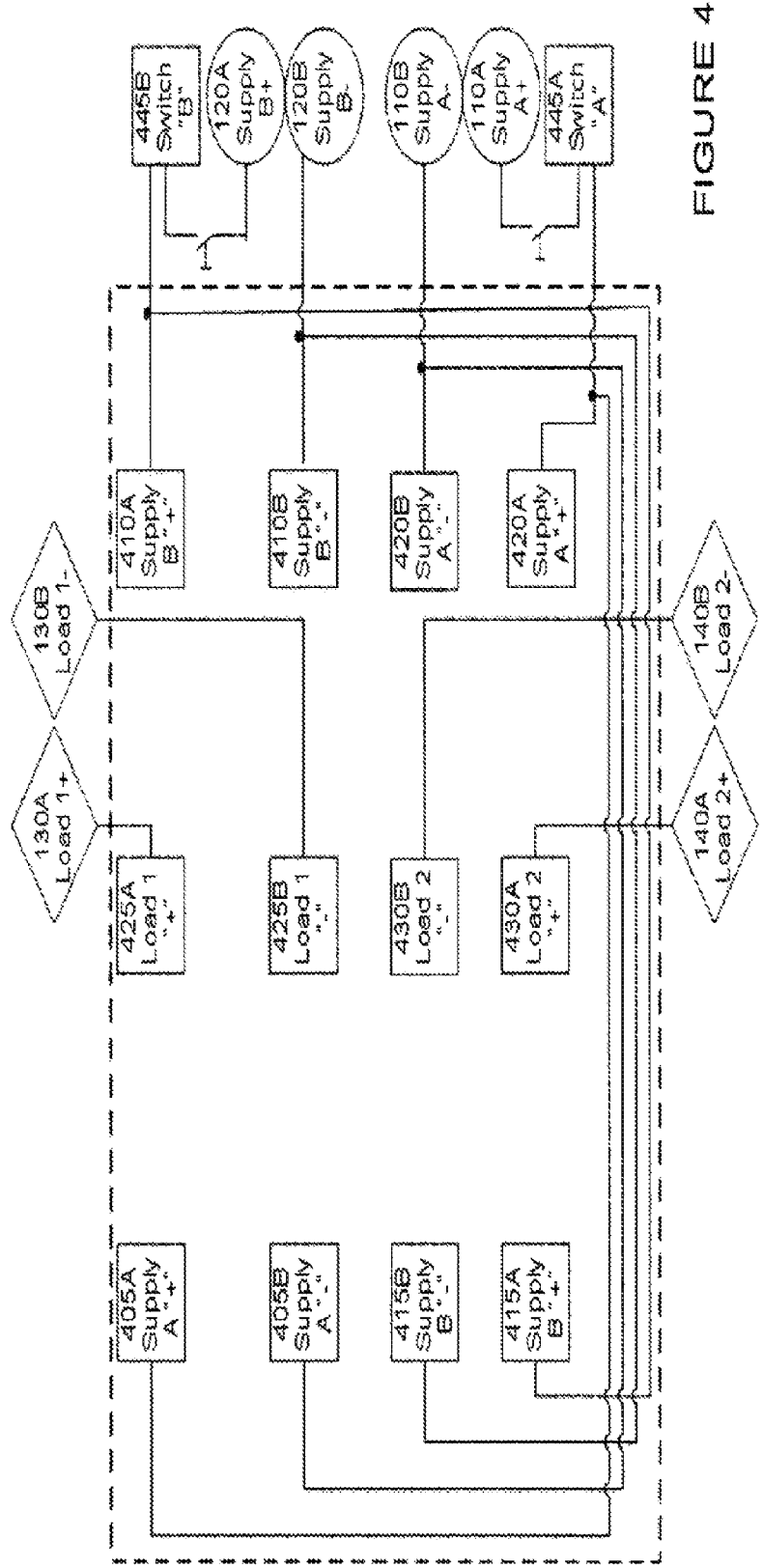
FIG. 4 shows an exemplary wiring diagram for the control unit 100 of FIG. 1, with internal connections shown within a rectangle with a dashed line.
Figure 5A:
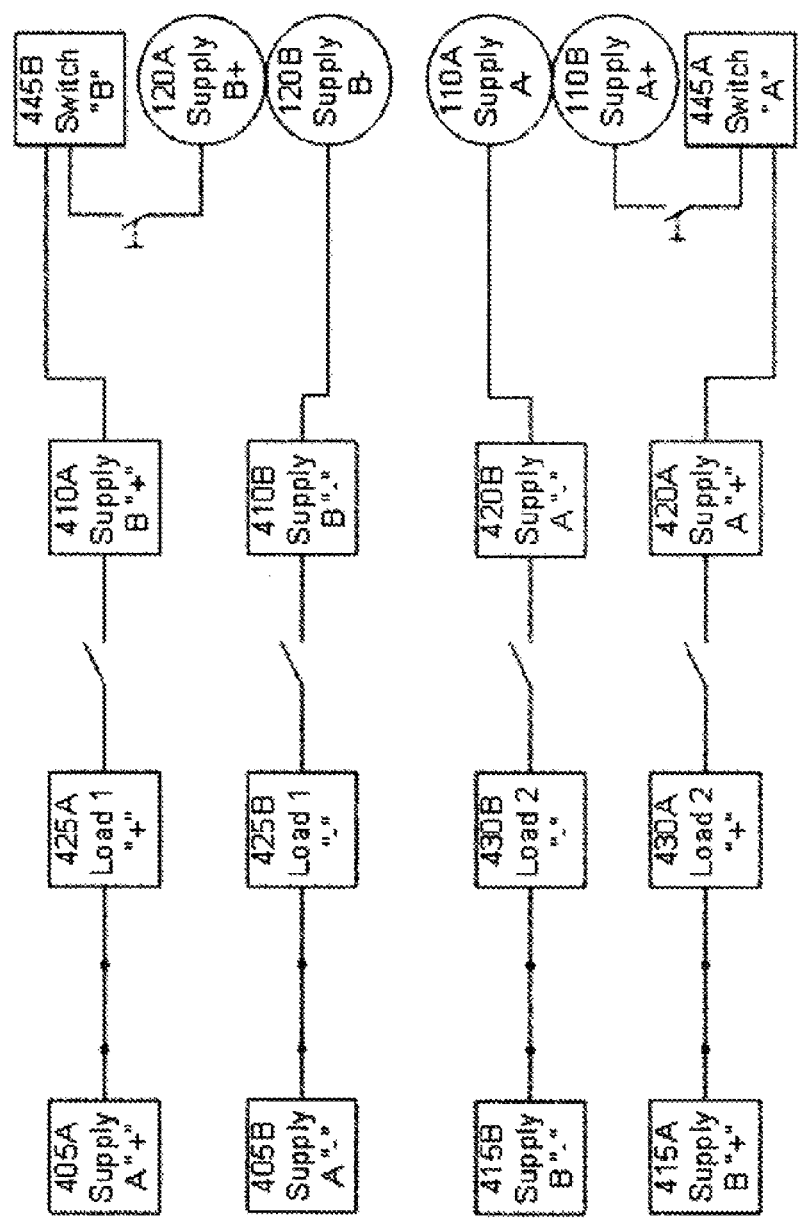
FIG. 5A represents the wiring diagram of FIG. 4 (simplified by removing the connections to the external load nodes 130A, 130B, 140A, 140B) having connections corresponding with the first state shown in FIG. 2A.
Figure 5B:
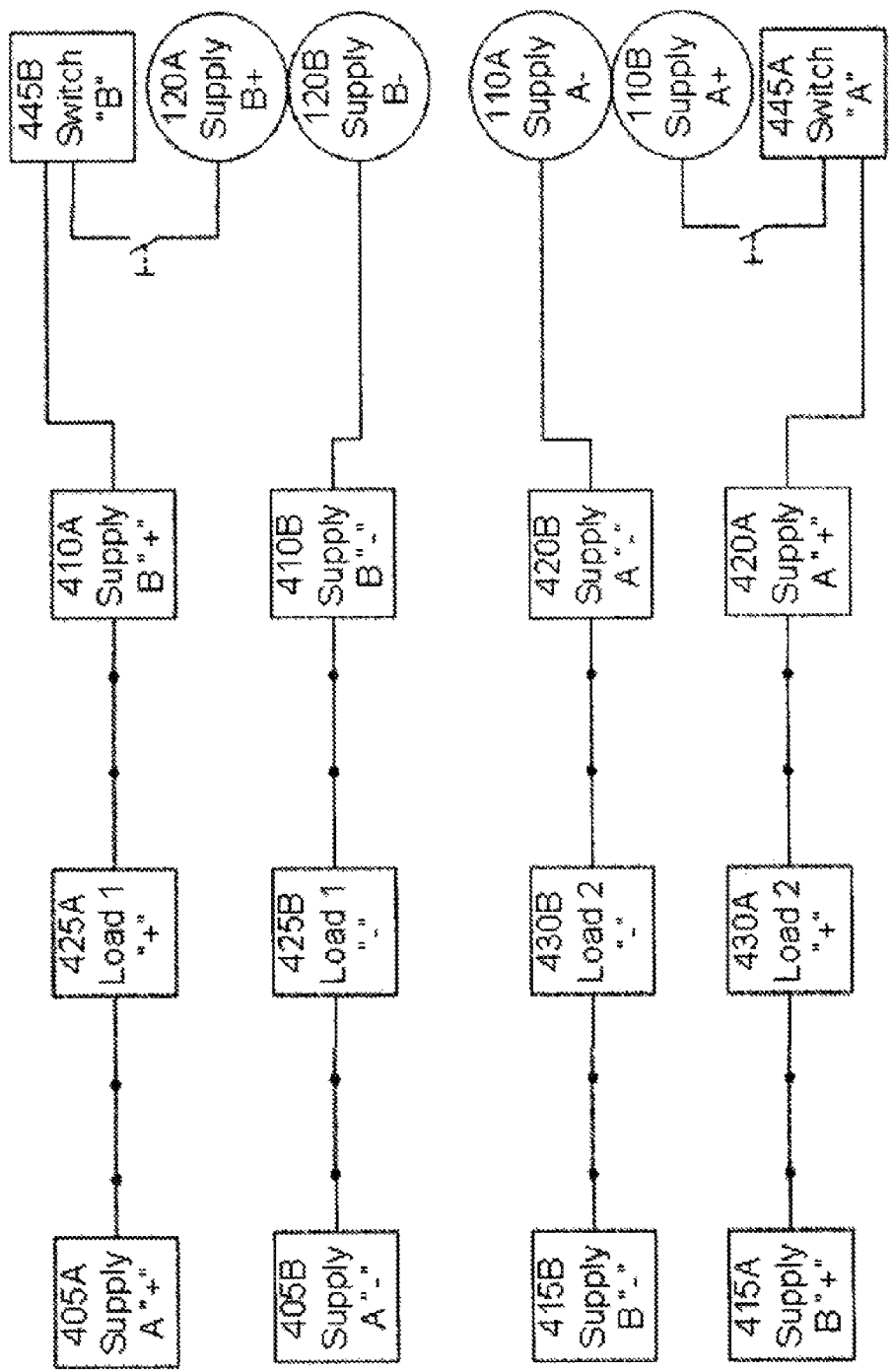
FIG. 5B shows the wiring diagram of FIG. 5A having connections corresponding with the transition state shown in FIG. 2B.
Figure 5C:
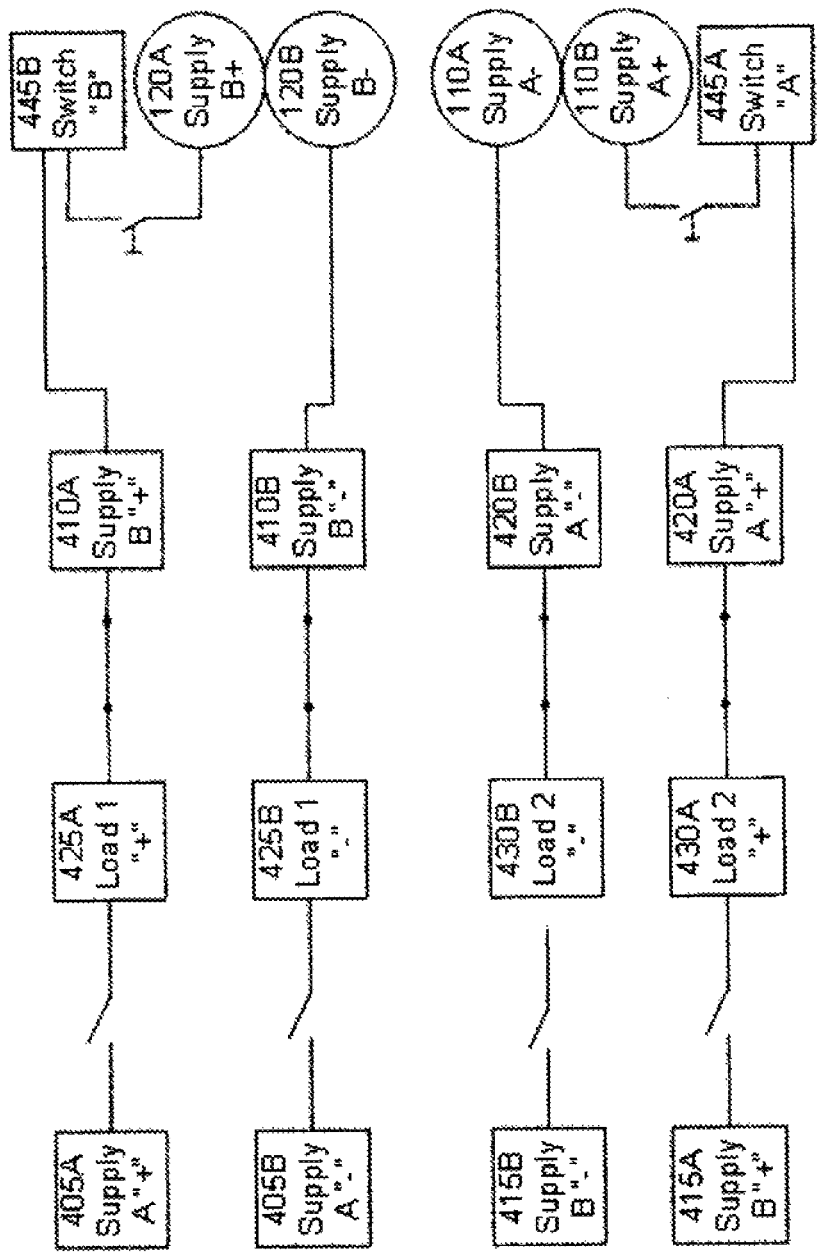
FIG. 5C shows the wiring diagram of FIG. 5A having connections corresponding with the second state shown in FIG. 2C.

Turning to FIG. 4, the control unit 100 (represented by the components within the rectangle with dashed lines) is shown having eight supply contacts (405A, 405B, 410A, 410B, 415A, 415B, 420A, 420B) and four load contacts (425A, 425B, 430A, 430B) internally. The internal supply and load contacts interface with external load positive nodes 130A, 140A, load negative nodes 130B, 140B, supply positive nodes 110A, 120A, and supply negative nodes 110B, 120B (the positive and negative nodes corresponding to the positive and negative terminals of the supplies and loads, respectively). Internally, the two first supply positive contacts 405A and 420A are "permanently" wired (that is, connected in all states, including the transition state) to each other, as are the two first supply negative contacts 405B and 420B. Similarly, the two second supply positive contacts 410A and 415A are permanently wired to each other, as are the two second supply negative contacts 410B and 415B. The first load positive and negative contacts 425A, 425B (internal) connect with the first load positive and negative nodes 130A, 130B (external) when the first load 130 interfaces with the control unit 100. Similarly, the second load positive and negative contacts 430A, 430B (internal) connect with the second load positive and negative nodes 140A, 140B (external) when the second load 140 interfaces with the control unit 100. The eight supply contacts and their permanent wiring allow the control unit 100 to transition between states by connecting and disconnecting the supply and load contacts internally, as demonstrated in FIGS. 5A, 5B, and 5C. FIGS. 5A, 5B, and 5C correspond with the wiring diagram of FIG. 4, with the load positive and negative nodes 130A, 130B, 140A, and 140B removed for clarity.

Referring first to FIG. 5A, which corresponds with the first state, the first supply 110 is connected to the first load 130 in series, and the second supply 120 is connected to the second load 140 in series (see also FIG. 2A). As shown, the control unit 100 can effect the first state by connecting: the first supply positive contact 405A with the first load positive contact 425A; the first supply negative contact 405B with the first load negative contact 425B; the second supply positive contact 415A with the second load positive contact 430A; and the second supply negative contact 415B with the second load negative contact 430B. The load contacts 425A, 425B, 430A, and 430B are left unconnected from the supply contacts 410A, 410B, 420A, and 420B in this first state.

Referring next to FIG. 5B, which corresponds with the transition state, the first and second supplies 110, 120 and the first and second loads 130, 140 are all connected in parallel (see also FIG. 2B). As shown, the control unit 100 can effect the transition state by leaving the connections shown in FIG. 5A, and additionally connecting: the first load positive contact 425A with the second supply positive contact 410A; the first load negative contact 425B with the second supply negative contact 410B; the second load positive contact 430A with the first supply positive contact 420A; and the second load negative contact 430B with the first supply negative contact 420B. These connections, in addition to the permanent wiring of the supply contacts discussed above, result in all the supplies and loads being connected in parallel in the control unit 100.

It is noted that in a system with a motor and a generator as loads, in the transition state the battery packs are connected to both a generator and motor at the same time. This does not, however, result in the battery packs being both charged and drained simultaneously. Rather, the current from the generator bypasses the batteries to power the motor. This can be observed by battery measurements showing that in the transition state the batteries are not charged. As electrical current follows the paths of least resistance, the path from the generator to the motor is expected to provide less resistance than the path through the batteries.

Referring lastly to FIG. 5C, which corresponds with the second state, the first supply 110 is connected to the second load 140 in series, and the second supply 120 is connected to the first load 130 in series (see also FIG. 2C). The connections on the left side of the load contacts in FIG. 5A (that is, to the left of 425A, 425B, 430A, 430B) are disconnected: the first supply positive contact 405A from the first load positive contact 425A; the first supply negative contact 405B from the first load negative contact 425B; the second supply positive contact 415A from the second load positive contact 430A; and the second supply negative contact 415B from the second load negative contact 430B. In addition, the connections shown on the right side of the load contacts in FIG. 5B are left connected: the first load positive contact 425A with the second supply positive contact 410A; the first load negative contact 425B with the second supply negative contact 410B; the second load positive contact 430A with the first supply positive contact 420A; and the second load negative contact 430B with the first supply negative contact 420B.

Although not pictured, the control unit 100 may be configured to have a state in which all power supplies and loads are disconnected from each other. In such an "off" state, the connections of FIG. 5A are disconnected: the first supply positive contact 405A from the first load positive contact 425A; the first supply negative contact 405B from the first load negative contact 425B; the second supply positive contact 415A from the second load positive contact 430A; and the second supply negative contact 415B from the second load negative contact 430B. Additionally, the connections of FIG. 5C are disconnected: the first load positive contact 425A from the second supply positive contact 410A; the first load negative contact 425B from the second supply negative contact 410B; the second load positive contact 430A from the first supply positive contact 420A; and the second load negative contact 430B from the first supply negative contact 420B.

The separation of the internal contacts from the external nodes of the supplies and loads allows the control unit 100 to interface with various replaceable supplies and loads. By connecting the supply and load contacts internally, the circuits for the first, second, and transition states can be formed without connecting and disconnecting the supplies and loads from the control unit 100. However, the supplies and loads can be incorporated with the control unit 100 in an integrated system. The switches 445A, 445B in FIGS. 4, 5A, 5B, and 5C allow the power supplies 110, 120, respectively, to be turned on or shut off regardless of the internal connections of the control unit 100, allowing for a bypass of the control unit 100.

Switches 445A, 445B are shown in FIG. 4 as external to the control unit 100, but could alternatively be implemented internally to the control unit 100 to enable or disable contacts as desired separately from other internal connections of the supply and load contacts.

The invention may be embodied in whole or in part within the circuitry of an application specific integrated circuit (ASIC) or a programmable logic device (PLD). In such a case, the invention may be embodied, for example, in a computer understandable descriptor language which may be used to create an ASIC or PLD that operates as herein described. For example, the control unit 100 may be implemented as an ASIC that interfaces with various power supplies and loads.

Although implementations of the invention may commonly utilize electronic circuitry and computer hardware/software, the invention may alternatively or additionally be implemented using mechanical components. For example, the contacts and "permanent" connections therebetween may be implemented using metal contacts and wiring (such as copper or brass). One or more connectors (such as metal wires) may be used to connect the contacts together to effect the various non-transition states and the transition state. The particular contacts connected to each other are determined by the position of the connector, and the connector's position may be changed via, for example, movement of a lever. The lever may slide the connector into different positions to complete the various circuits. Alternatively, the lever may include a shaft extending through the centers of four wheels, each wheel having a connector covering a majority of the circumference of the wheels. The turning of the wheels using the lever would bring the connectors into position to connect the various power supply and load contacts together to form the circuits of the different states. The lever may moreover be connected to motors that power the movements of the lever to bring the connector in various positions connecting particular contacts, as discussed above.

The process 300 shown in FIG. 3 is only one possible process and can be modified in numerous ways. Process 300 as shown continues until override 330 directs the process 300 to end 350. The overrides 325, 330 may be received from another system or process based on parameters not dependent on user input. The process may be modified to, for example, include safety protocols in which process ends and/or the system is shut down if parameters such as power supply stability, load demand, and system temperature reach unsafe levels. Also, the process 300 need not provide for harmonization 320 where, for example, the system is not to be connected to power supplies of varying voltage levels or frequencies.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A system for controlling power supplies and loads, the system including a control unit configured to:
   a) interface with:
      1) a first power supply and a second power supply,
         (i) the first power supply having a pair of first supply positive contacts and a pair of first supply negative contacts, and
         (ii) the second power supply having a pair of second supply positive contacts and a pair of second supply negative contacts;

2) a first load and a second load,
   (i) the first load having a first load positive contact and a first load negative contact, and
   (ii) the second load having a second load positive contact and a second load negative contact;
b) transition between first and second states via a transition state, the first and second states being non-transition states, wherein:
   1) in the first state, the control unit connects:
      (i) the first load positive contact and the first load negative contact with:
         (A) one of the pair of first supply positive contacts; and
         (B) one of the pair of first supply negative contacts; and
      (ii) the second load positive contact and the second load negative contact with:
         (A) one of the pair of second supply positive contacts; and
         (B) one of the pair of second supply negative contacts;
   2) in the second state, the control unit connects:
      (i) the first load positive contact and the first load negative contact with:
         (A) one of the pair of second supply positive contacts; and
         (B) one of the pair of second supply negative contacts; and
      (ii) the second load positive contact and the second load negative contact with:
         (A) one of the pair of first supply positive contacts; and
         (B) one of the pair of first supply negative contacts; and
   3) in the transition state, the control unit connects:
      (i) the first load positive contact and the first load negative contact with:
         (A) one of the pair of first supply positive contacts and one of the pair of first supply negative contacts; and
         (B) one of the pair of second supply positive contacts and one of the pair of second supply negative contacts; and
      (ii) the second load positive contact and the second load negative contact with:
         (A) one of the pair of first supply positive contacts and one of the pair of first supply negative contacts; and
         (B) one of the pair of second supply positive contacts and one of the pair of second supply negative contacts.

2. The system of claim 1 wherein:
a) the first power supply has a first supply voltage that is at least substantially equal to a second supply voltage of the second power supply; and
b) the transition state maintains the voltage across the first and second loads at the supply voltage without substantial interruption as the system switches between the first and second states.

3. The system of claim 1 further including a first power supply and a second power supply, wherein:
a) the first power supply has a first supply voltage, and the second power supply has a second supply voltage; and
b) the first supply voltage is at least substantially equal to the second supply voltage.

4. The system of claim 3 wherein:
a) the first power supply further has a first supply frequency, and the second power supply further has a second supply frequency; and
b) the first supply frequency is at least substantially equal to the second supply frequency.

5. The system of claim 1 wherein the control unit is further configured to:
a) detect a first charge level of the first power supply and a second charge level of the second power supply; and
b) transition between the first and second states when the first or second charge level reaches a predetermined charge level threshold.

6. The system of claim 1 further including an input unit configured to accept instructions from a user to effect the transition between the first and second states, wherein the input unit includes a lever configured to effect movement of a connector which connects and disconnects the first and second power supplies with the first and second loads to complete circuits required by the first, second, and transition states.

7. The system of claim 1 further including an input unit configured to accept an instruction to transition between the first and second states from a user, wherein the control unit is further configured to receive a control signal from the input unit, the control signal directing the control unit to transition between the first and second states.

8. The system of claim 1:
a) further including:
   1) a first power supply having a first supply positive node and a first supply negative node;
   2) a second power supply having a second supply positive node and a second supply negative node;
   3) a first load having a first load positive node and a first load negative node;
   4) a second load having a second load positive node and a second load negative node;
b) wherein:
   1) the pair of first supply positive contacts are connected to the first supply positive node, and the pair of first supply negative contacts are connected to the first supply negative node;
   2) the pair of second supply positive contacts are connected to the second supply positive node, and the pair of second supply negative contacts are connected to the second supply negative node;
   3) the first load positive contact is connected to the first load positive node, and the first load negative contact is connected to the first load negative node; and
   4) the second load positive contact is connected to the second load positive node, and the second load negative contact is connected to the second load negative node.

9. The system of claim 8 wherein in all states:
a) the pair of first supply positive contacts are connected to each other in all states, and the pair of first supply negative contacts are connected to each other;
b) the pair of second supply positive contacts are connected to each other, and the pair of second supply negative contacts are connected to each other.

10. The system of claim 1 wherein the control unit is further configured to harmonize voltages of power supplies connected thereto prior to entering the transition state, such that a first supply voltage of the first power supply and a second supply voltage of the second power supply are at least substantially the same.

11. The system of claim 10 further including a voltage converter, wherein the control unit harmonizes power supply voltages using the voltage converter.

12. The system of claim 1 wherein the control unit is further configured to harmonize frequencies of power supplies connected thereto prior to entering the transition state, such that a first supply frequency of the first power supply and a second supply frequency of the second power supply are at least substantially the same.

13. The system of claim 1 further including a first power supply, a second power supply, a first load, and a second load, wherein:
  a) the first and second power supplies are first and second battery units;
  b) the first load is a motor and the second load is a generator;
  c) in the first state, the first power supply is powering the motor and the second power supply is being charged by the generator; and
  d) in the second state, the first power supply is being charged by the generator and the second power supply is powering the motor.

14. A system for controlling power supplies and loads, the system including:
  a) a first power supply having:
    1) a first supply voltage, and
    2) a pair of first supply positive contacts and a pair of first supply negative contacts;
  b) a second power supply having:
    1) a second supply voltage, the first and second supply voltages being at least substantially equal to each other, and
    2) a pair of second supply positive contacts and a pair of second supply negative contacts;
  c) a first load and a second load,
    1) the first load:
      (i) being a motor, and
      (ii) having a first load positive contact and a first load negative contact; and
    2) a second load:
      (i) being a generator, and
      (ii) having a second load positive contact and a second load negative contact;
  d) a control unit configured to transition between first and second states, wherein:
    1) in the first state:
      (i) the first power supply powers the motor and the generator charges the second power supply;
      (ii) the first load positive contact connects with one of the pair of first supply negative contacts;
      (iii) the first load negative contact connects with one of the pair of first supply positive contacts;
      (iv) the second load positive contact connects with one of the pair of second supply negative contacts;
      (v) the second load negative contact connects with one of the pair of second supply positive contacts; and
    2) in the second state:
      (i) the generator charges the first power supply and the second power supply powers the motor;
      (ii) the first load positive contact connects with one of the pair of second supply negative contacts;
      (iii) the first load negative contact connects with one of the pair of second supply positive contacts;
      (iv) the second load positive contact connects with one of the pair of first supply negative contacts; and
      (v) the second load negative contact connects with one of the pair of first supply positive contacts; and
  3) the control unit transitions between the first and second states via a transition state in which:
    (i) the first load positive contact connects with:
      (A) one of the pair of first supply negative contacts;
      (B) one of the pair of second supply negative contacts;
    (ii) the first load negative contact connects with:
      (A) one of the pair of first supply positive contacts; and
      (B) one of the pair of second supply positive contacts;
    (iii) the second load positive contact connects with:
      (A) the other of the pair of first supply negative contacts; and
      (B) the other of the pair of second supply negative contacts; and
    (iv) the second load negative contact connects with:
      (A) the other one of the pair of first supply positive contacts; and
      (B) the other of the pair of second supply positive contacts.

15. A method for controlling power supplies and loads, the method including the steps of:
  a) interfacing a control unit with:
    1) a first power supply and a second power supply,
      (i) the first power supply having a pair of first supply positive contacts and a pair of first supply negative contacts, and
      (ii) the second power supply having a pair of second supply positive contacts and a pair of second supply negative contacts; and
    2) a first load and a second load,
      (i) the first load having a first load positive contact and a first load negative contact, and
      (ii) the second load having a second load positive contact and a second load negative contact;
  b) using the control unit to transition between first and second states via a transition state, the first and second states being non-transition states, wherein:
    1) in the first state:
      (i) the first load positive contact and the first load negative contact connect with:
        (A) one of the pair of first supply positive contacts; and
        (B) one of the pair of first supply negative contacts; and
      (i) the second load positive contact and the second load negative contact connect with:
        (A) one of the pair of second supply positive contacts; and
        (B) one of the pair of second supply negative contacts;
    2) in the second state:
      (i) the first load positive contact and the first load negative contact connect with:
        (A) one of the pair of second supply positive contacts; and
        (B) one of the pair of second supply negative contacts; and
      (ii) the second load positive contact and the second load negative contact connect with:
        (A) one of the pair of first supply positive contacts; and
        (B) one of the pair of first supply negative contacts; and 3) in the transition state:
   (i) the first load positive contact and the first load negative contact connect with:
      (A) one of the pair of first supply positive contacts and one of the pair of first supply negative contacts; and
      (B) one of the pair of second supply positive contacts and one of the pair of second supply negative contacts; and
   (ii) the second load positive contact and the second load negative contact connect with:
      (A) one of the pair of first supply positive contacts and one of the pair of first supply negative contacts; and
      (B) one of the pair of second supply positive contacts and one of the pair of second supply negative contacts.

16. A system for controlling power supplies and loads, the system including a control unit, wherein:
   a) the control unit includes:
      1) a pair of first supply positive contacts and a pair of first supply negative contacts;
      2) a pair of second supply positive contacts and a pair of second supply negative contacts;
      3) a first load positive contact and a first load negative contact; and
      4) a second load positive contact and a second load negative contact;
   b) the control unit is configured to:
      1) interface with:
         (i) a first power supply and a second power supply; and
         (ii) a first load and a second load; and
      2) transition between first and second states via a transition state, the first and second states being non-transition states;
   c) in the first state, the control unit connects:
      1) the first load positive contact and the first load negative contact with:
         (i) one of the pair of first supply positive contacts; and
         (ii) one of the pair of first supply negative contacts; and
      2) the second load positive contact and the second load negative contact with:
         (i) one of the pair of second supply positive contacts; and
         (ii) one of the pair of second supply negative contacts;
   d) in the second state, the control unit connects:
      1) the first load positive contact and the first load negative contact with:
         (i) one of the pair of second supply positive contacts; and
         (ii) one of the pair of second supply negative contacts; and
      2) the second load positive contact and the second load negative contact with:
         (i) one of the pair of first supply positive contacts; and
         (ii) one of the pair of first supply negative contacts; and
   e) in the transition state, the control unit connects:
      1) the first load positive contact and the first load negative contact with:
         (i) one of the pair of first supply positive contacts and one of the pair of first supply negative contacts; and
         (ii) one of the pair of second supply positive contacts and one of the pair of second supply negative contacts; and
      2) the second load positive contact and the second load negative contact with:
         (i) one of the pair of first supply positive contacts and one of the pair of first supply negative contacts; and
         (ii) one of the pair of second supply positive contacts and one of the pair of second supply negative contacts.

17. A system for controlling power supplies and loads,
   a) the system including a control unit configured to interface with:
      1) a first power supply having a pair of first supply positive contacts and a pair of first supply negative contacts;
      2) a second power supply having a pair of second supply positive contacts and a pair of second supply negative contacts;
      3) a first load having a first load positive contact and a first load negative contact; and
      4) a second load having a second load positive contact and a second load negative contact;
   b) wherein:
      1) the control unit is configured to transition between first and second states via a transition state, the first and second states being non-transition states;
      2) in the first state, the control unit connects:
         (i) the first load positive contact with one of the pair of first supply negative contacts;
         (ii) the first load negative contact with one of the pair of first supply positive contacts;
         (iii) the second load positive contact with one of the pair of second supply negative contacts;
         (iv) the second load negative contact with one of the pair of second supply positive contacts; and
      3) in the second state, the control unit connects:
         (i) the first load positive contact with one of the pair of second supply negative contacts;
         (ii) the first load negative contact with one of the pair of second supply positive contacts;
         (iii) the second load positive contact with one of the pair of first supply negative contacts; and
         (iv) the second load negative contact with one of the pair of first supply positive contacts; and
      4) in the transition state, the control unit connects:
         (i) the first load positive contact with:
            (A) one of the pair of first supply negative contacts;
            (B) one of the pair of second supply negative contacts;
         (ii) the first load negative contact with:
            (A) one of the pair of first supply positive contacts; and
            (B) one of the pair of second supply positive contacts;
         (iii) the second load positive contact with:
            (A) the other of the pair of first supply negative contacts; and
            (B) the other of the pair of second supply negative contacts; and
         (iv) the second load negative contact with:
            (A) the other one of the pair of first supply positive contacts; and
            (B) the other of the pair of second supply positive contacts.

* * * * *